US007853732B2

(12) United States Patent
Kim et al.

(10) Patent No.: US 7,853,732 B2
(45) Date of Patent: Dec. 14, 2010

(54) METHOD AND DEVICE FOR CONTROLLING SLAVE DEVICES WITH MASTER DEVICE

(75) Inventors: Jae-kwon Kim, Suwon-si (KR); Yong-jun Kim, Yongin-si (KR); Hyo-dae Kim, Suwon-si (KR); Yu-seong Jeon, Suwon-si (KR); Young-mi Kang, Yongin-si (KR); Sung-hee Kim, Seoul (KR); Jong-wook Park, Seoul (KR); Eu-gene Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 10/922,927

(22) Filed: Aug. 23, 2004

(65) Prior Publication Data

US 2005/0065619 A1 Mar. 24, 2005

(30) Foreign Application Priority Data

Aug. 21, 2003 (KR) ..................... 10-2003-0057899

(51) Int. Cl.
*G06F 3/00* (2006.01)

(52) U.S. Cl. ............................ 710/19; 710/110; 700/3; 715/716

(58) Field of Classification Search ..................... 700/3; 715/716, 717; 710/110, 19
See application file for complete search history.

(56) References Cited

U.S. PATENT DOCUMENTS

| | | | | |
|---|---|---|---|---|
| 6,127,941 | A | 10/2000 | Van Ryzin | |
| 2003/0095211 | A1 | 5/2003 | Nakajima | |
| 2005/0027539 | A1 * | 2/2005 | Weber et al. | 704/275 |
| 2005/0097503 | A1 * | 5/2005 | Zintel et al. | 717/100 |
| 2006/0007933 | A1 * | 1/2006 | Maxson et al. | 370/392 |
| 2006/0101338 | A1 * | 5/2006 | Kates | 715/716 |
| 2007/0027709 | A1 * | 2/2007 | Grate et al. | 705/1 |

FOREIGN PATENT DOCUMENTS

| | | | |
|---|---|---|---|
| EP | 1 061 490 | A2 | 12/2000 |
| EP | 1 282 032 | A2 | 2/2003 |
| JP | 6-261372 | A | 9/1994 |
| JP | 8-18813 | A | 1/1996 |
| JP | 11-355685 | A | 12/1999 |
| KR | 010064657 | A | 7/2001 |
| KR | 10-2002-0017730 | A | 3/2002 |
| KR | 2003-0042528 | A | 6/2003 |
| WO | 03/044625 | A2 | 5/2003 |

* cited by examiner

*Primary Examiner*—Clifford H Knoll
(74) *Attorney, Agent, or Firm*—Sughrue Mion, PLLC

(57) ABSTRACT

A method and device for controlling slave devices with a master device. The device performs specific functions to control operations of slave devices with a master device, and includes a user input receiving unit that receives an input from a user, a memory unit that stores command sets, each command set corresponding to a series of operation controls of the master device or one of the slave devices, and a control unit that generates operation control signals of the master device or one of the slave devices when an operation control command set is selected, the operation control signals corresponding to the selected operation control command set.

4 Claims, 8 Drawing Sheets

METHOD AND DEVICE FOR CONTROLLING SLAVE DEVICES WITH MASTER DEVICE

CROSS-REFERENCE TO RELATED APPLICATION

This application is based on and claims priority from Korean Patent Application No. 10-2003-0057899 filed Aug. 21, 2003, the disclosure of which is hereby incorporated herein by reference.

BACKGROUND OF THE INVENTION

1. Field of the Invention

The present invention relates in general to a method and device for controlling slave devices with a master device and, more particularly, to a method and device for controlling operations of slave devices with a master device, providing a predetermined user interface (UI) so as to allow a user to control any concerned slave device through the master device connected to the concerned slave device through a network.

2. Description of the Related Art

Generally in order to control plural slave devices connected to a master device, slave devices 11, 12 and 13 and a master device 20 in connection with the slave devices 11, 12 and 13 are controlled by means of separate remote controls thereto 31, 32, 33 and 34 as illustrated in FIG. 1.

However, when separate remote controls are used to separately control the slave devices 11, 12 and 13 and the master device 20, the user needs to have basic knowledge about the separate remote controls, such as how to use them. This makes the use of separate remote controls inconvenient.

To solve such an inconvenience, the slave devices 41, 42 and 43 and a master device 50 in connection with the slave devices 41, 42 and 43 may be controlled by means of a universal remote control 60. The use of the universal remote control 60 allows the user to switch a mode of the universal remote control 60 and set up the mode adaptively to a device that the user desires to control, as illustrated in FIG. 2.

Use of a universal remote control 60 is advantageous in that slave devices 41, 42 and 43 and a master device 50 can be controlled through a single remote control. However, the user has to switch a mode of the universal remote control 60 and set up and adapt the mode to any concerned device in order to control the concerned device. This makes it inconvenient to use the universal remote control.

SUMMARY OF THE INVENTION

The present invention is conceived to reduce the inconveniences to the user in the conventional remote control.

Consistent with an exemplary embodiment of the present invention, there is provided a method for performing specific functions to control operations of slave devices with a master device, including a first step of providing execution icons, each of said execution items corresponding to a command set for a series of operation controls of the master device or one of the slave devices, a second step of receiving a selection of at least one of the execution items, and a third step of controlling the series of operations corresponding to the at least one selected icon.

The first step may include providing sub-execution icons of each execution icon selected by a user.

The method may further include a fourth step of determining whether the series of operation controls has been normally performed.

The method may further include a fifth step of providing a content of the error and an alternative list of how to solve the error when it is determined an error has been generated in the fourth step.

Consistent with another exemplary embodiment of the present invention, there is provided a device for performing specific functions to control operations of slave devices with a master device, including a user input receiving unit that receives an input from a user, a memory unit that stores command sets, each command set corresponding to a series of operations of the master device or one of the slave devices, and a control unit that generates operation control signals of the master device or one of the slave devices when a operation control command set is selected, the operation control signals corresponding to the selected operation control command set.

The device may further comprises an icon providing unit that displays an icon representing control commands for a series of operations stored in the memory, at the user's request.

When the generated operation control signals are control signals of a concerned slave device of the slave devices, the slave device may transmit a response signal to the control unit in response to the control command, and the control unit may determine whether the concerned slave device operates normally based on the response signal.

The control unit outputs the content of the error and an alternative list of how to solve the error when it is determined that an error has been generated.

The alternative list may be categorized according to each control command of the operation control command sets and stored in the memory unit.

Consistent with a further exemplary embodiment of the present invention, there is provided a device for performing specific functions to control operations of slave devices with a master device, comprising a user input receiving unit that receives an input from a user, a memory unit that stores command sets, each command set corresponding to a series of operations of the master device and one of the slave devices, a menu providing unit that provides each of the operation control command sets in the form of an icon, and a control unit that controls an operation of the master device or one of the slave devices according to the control commands for the series of operations corresponding to the selected execution icon.

The control unit may provide sub-execution icons corresponding to the execution icon selected by the user through the menu providing unit.

BRIEF DESCRIPTION OF THE DRAWINGS

The above and other features and advantages of the present invention will become more apparent to those of ordinary skill in the art by describing in detail the preferred embodiments thereof with reference to the attached drawings in which.

DETAILED DESCRIPTION OF THE INVENTION

Figure 1:
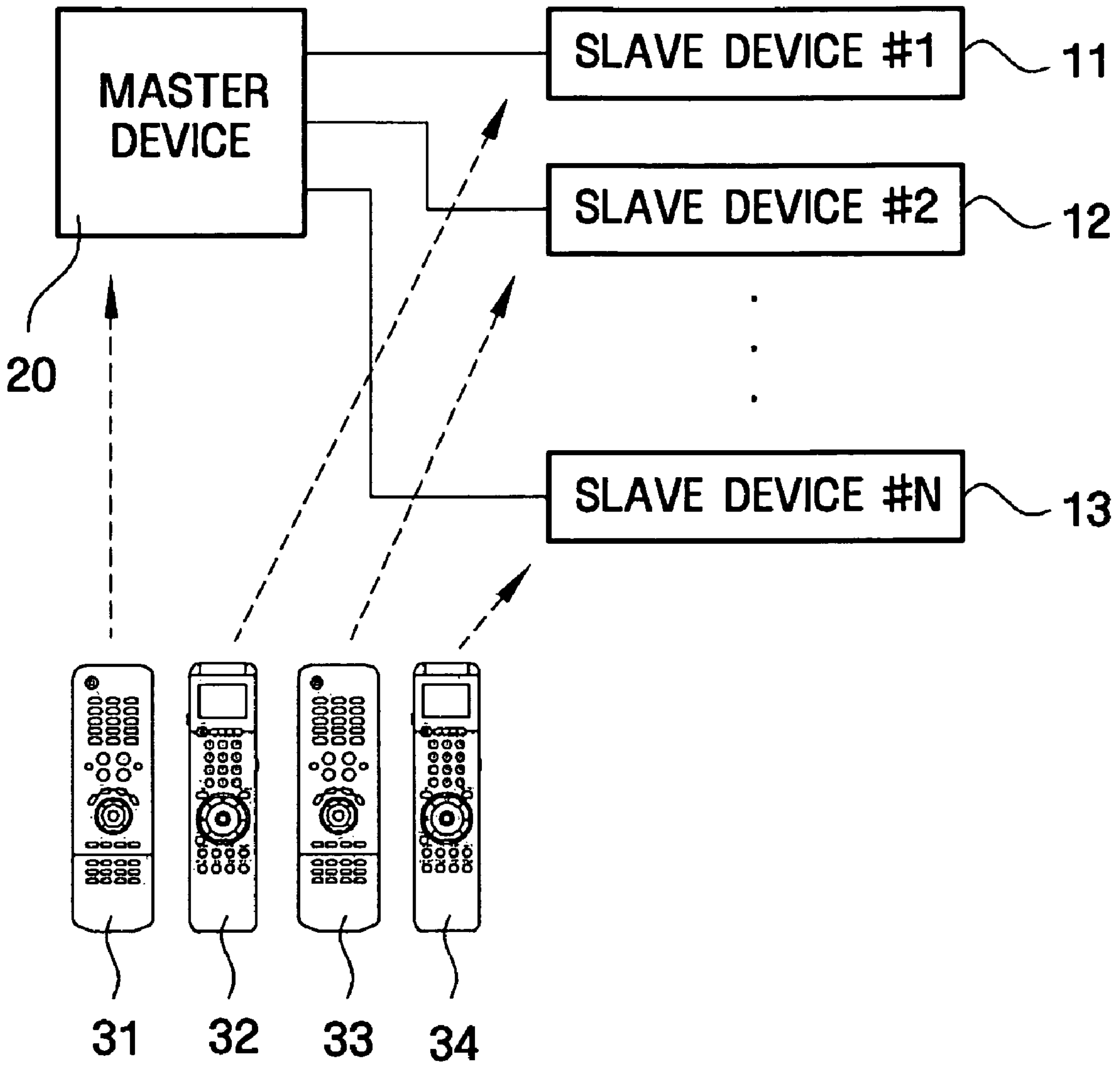
FIG. 1 (Prior Art)
FIG. 1 is a view illustrating separate remote controls for a master device and slave devices according to a conventional art.
Figure 2:
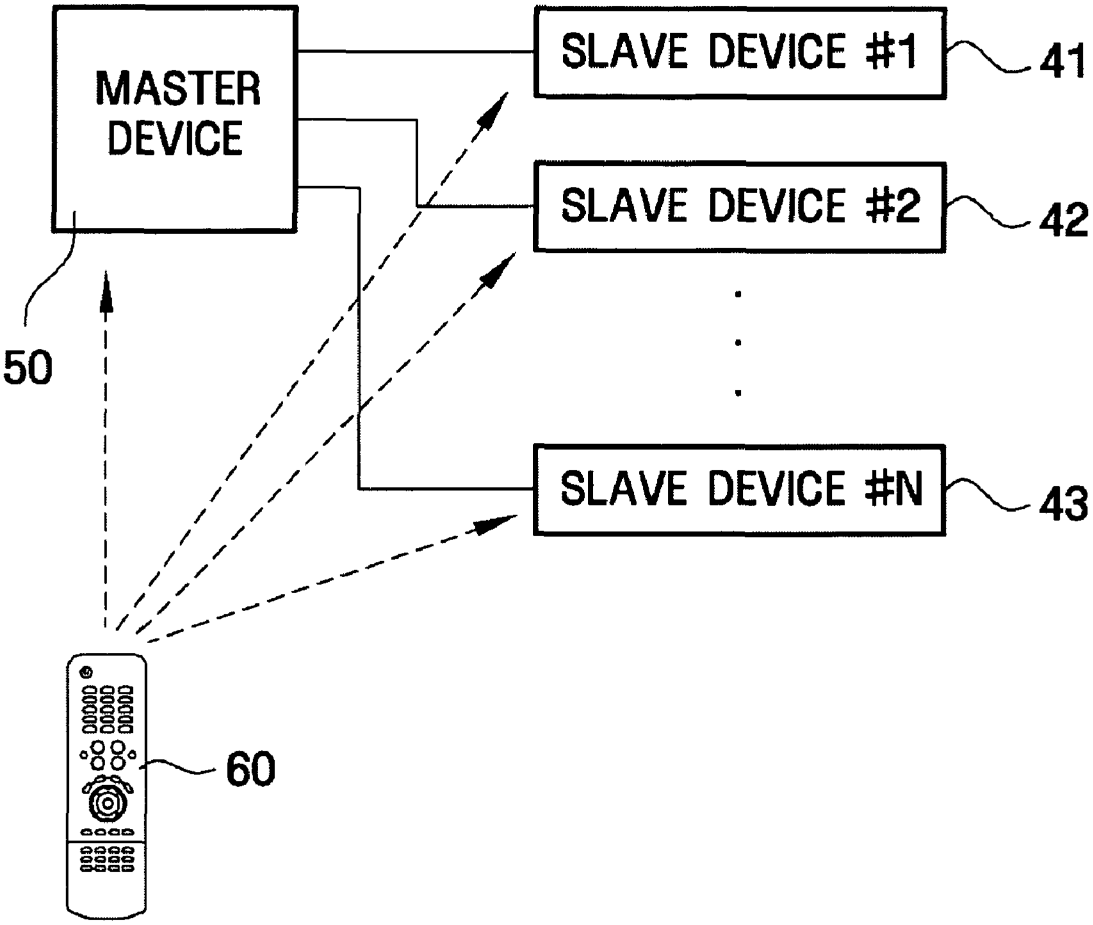
FIG. 2 is a view illustrating a universal remote control for a master device and slave devices according to a conventional art.

The present invention will be described more fully hereinafter with reference to the accompanying drawings, in which exemplary embodiments of the invention are illustrated. This invention may, however, be embodied in different forms and should not be construed as limited to the embodiments set fourth herein.

Advantages and merits of the present invention and any method to accomplish them will be apparent with reference to exemplary embodiments to be later described in detail in connection with the accompanying drawings. However, it should be noted that the present invention shall not be limited to the exemplary embodiments disclosed herein and may be implemented various and different embodiments. The exemplary embodiments will serve to clarify the disclosure of the present invention and to advise those having common knowledge in the art to which the present invention pertains of the category of the present invention more clearly, and the present invention shall be defined by the claims as claimed. The like reference numerals used through the specification will refer to the same elements.

Exemplary aspects of the present invention are to provide a method and a device for controlling operations of slave devices connected to a master device through a network by means of a single remote control, and to control operations of the slave device with a master device so as to allow a user to control operations of any concerned device in an easy manner by providing a predetermined user interface (UI) to control operations of the slave device through the master device.

Figure 3:
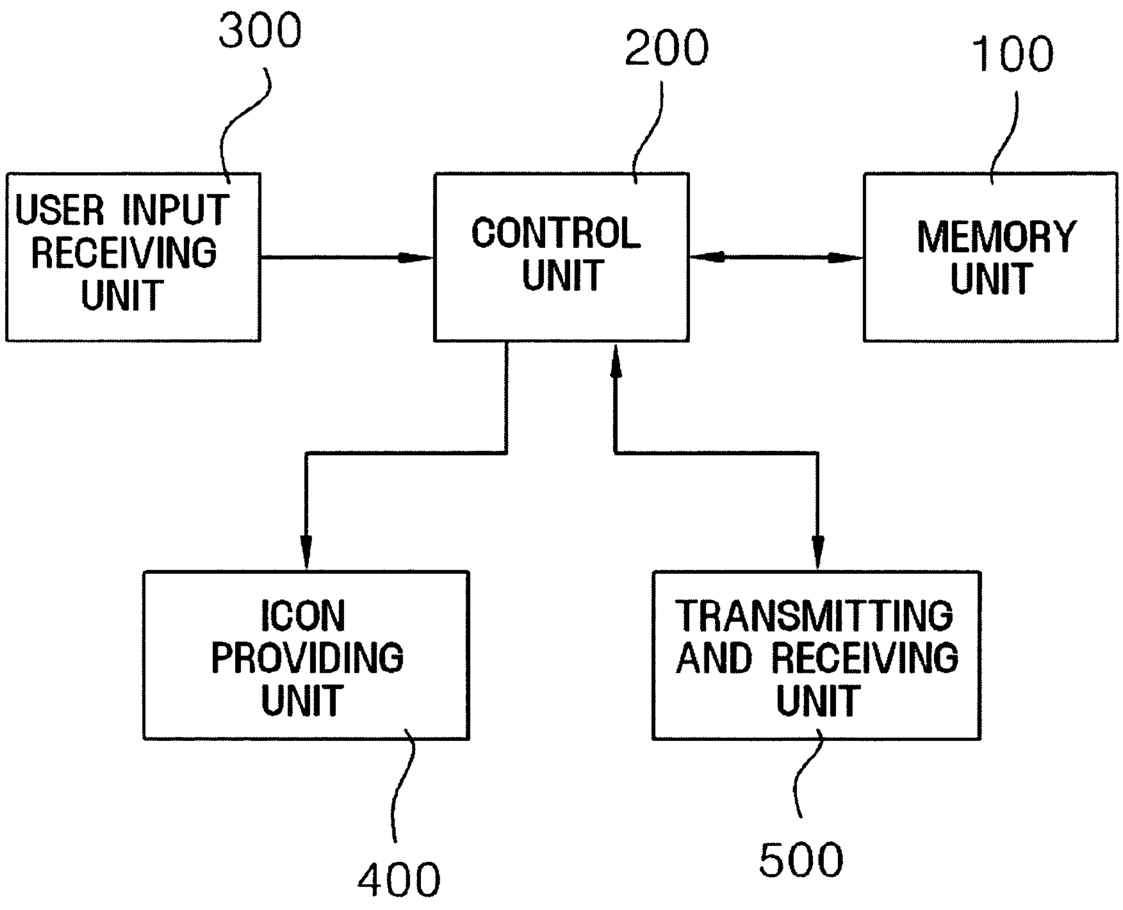
FIG. 3 is a block diagram illustrating a device for controlling slave devices with a master device according to an exemplary embodiment of the present invention.

As illustrated in FIG. 3, an Audio/Visual (A/V) device according to an exemplary embodiment of the present invention has a memory unit 100 that stores a set of commands to control a series of operations relative to a master device or one of a plurality of slave devices. A control unit 200 of the A/V device generates signals to control operations of a master device or a slave device based on commands to control a series of defined operations, when a predetermined operation control command set is selected.

The A/V device further comprises a user input receiving unit 300 that receives inputs by a user, an icon providing unit 400 displaying an execution icon representing each of operation control command sets, and a transmitting and receiving unit 500 that transmits an operation control signal of the control unit 200 to the slave device and that receives a response signal from the slave device according to the operation control signal.

The operation control command set includes an operation control command to control at least one slave device. The control unit 200 transmits the control operation command, which is included in the operation control command set, to the concerned slave device through the transmitting and receiving unit 500.

The control unit 200 displays execution icons corresponding to respective operation control command sets through the icon providing unit 400, and the control unit 200 provides sub-execution icons when there are sub-execution icons corresponding to an execution icon selected by a user. This allows the user to select a more detailed operation control command set.

At this time, the slave device transmits a response signal to the control unit 200 is response to the operation control command. The control unit 200 receives the response signal through the transmitting and receiving unit 500. Based on the response signal, the control unit 200 can determine whether the concerned device operates normally, and thus, the control unit 200 can determine whether the series of operation controls are performed in a normal manner.

When an error is determined, the control unit 200 may display the content of the error generated and may display an alternative list of how to solve the error through the icon providing unit 400. This allows the user to ascertain the error and promptly respond to the error.

At this time, the alternative list is categorized according to each operation control command included in the operation control command sets and stored in the memory unit 100.

The alternative list will be later described more fully with reference to FIG. 8.

The control unit 200 determines through a response signal to the predetermined operation control command whether either the master device or the slave device operates normally. When an error is generated in the course of determination, the control unit 200 reads out an alternative list concerning the error from the memory unit and displays the alternative list onto the icon providing unit 400.

A method for controlling slave devices with a master device constructed as described above according to an exemplary embodiment of the present invention will be described in more detail.

Figure 4:
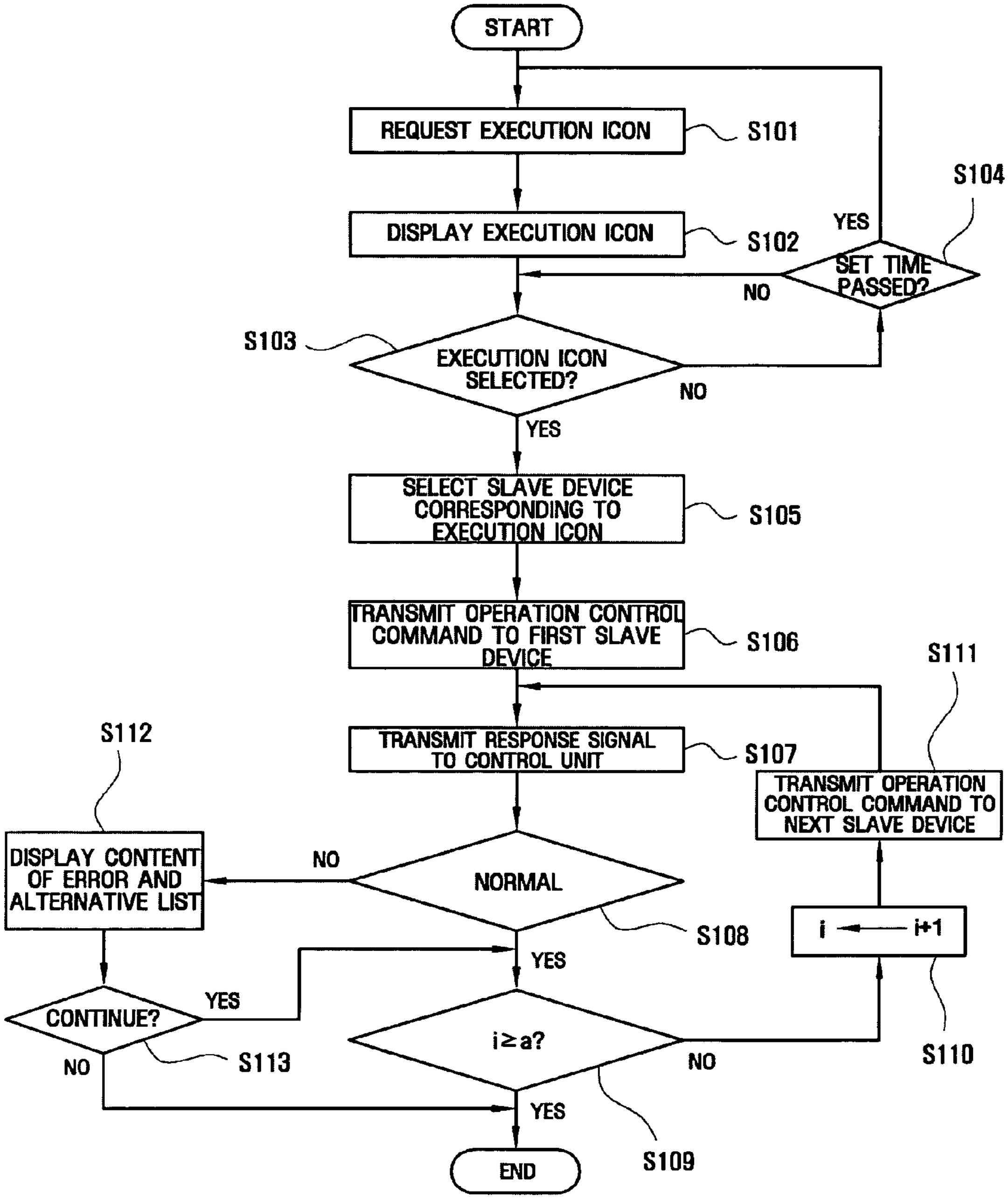
FIG. 4 is a flow chart illustrating a method for controlling slave devices with a master device according to an exemplary embodiment of the present invention.

As illustrated in FIG. 4, a user first requests an execution icon when he/she wishes to control a predetermined slave device (S101).

The request from the user is transmitted to the control unit 200 through the user input receiving unit 300, and the control unit 100 represents the respective operation control command sets stored in the memory unit 100 with a plurality of execution icons so that the user can easily recognize them and displays the execution items through the icon providing unit 400 (S102).

In the exemplary embodiment described above, the plurality of execution icons are displayed through a predetermined user interface called a menu providing unit 600. The menu providing unit 600 includes a plurality of execution icons corresponding to the respective operation control command sets. The execution icon selected by the user is highlighted so that the user can easily ascertain the execution icon as selected by him/her.

At this time, the operation control command set may include an operation control command to control at least one slave device.

The user selects an execution icon that the user wishes to execute from the menu providing unit 600 displayed through the icon providing unit 400 (S103).

At this time, the execution icons are arranged according to a hierarchy. This makes it possible to select from a wide range of detailed execution icons. When the user selects an execution icon that has sub-execution icons, the concerned sub-execution icons are provided.

The menu providing unit 600 may include the execution icons corresponding to the operation control command sets and sub-execution icons under the execution icon selected by the user.

The execution icons or sub-execution icons thereof may be added or deleted depending upon the addition or deletion of slave devices connected to the master device.

Figure 5:
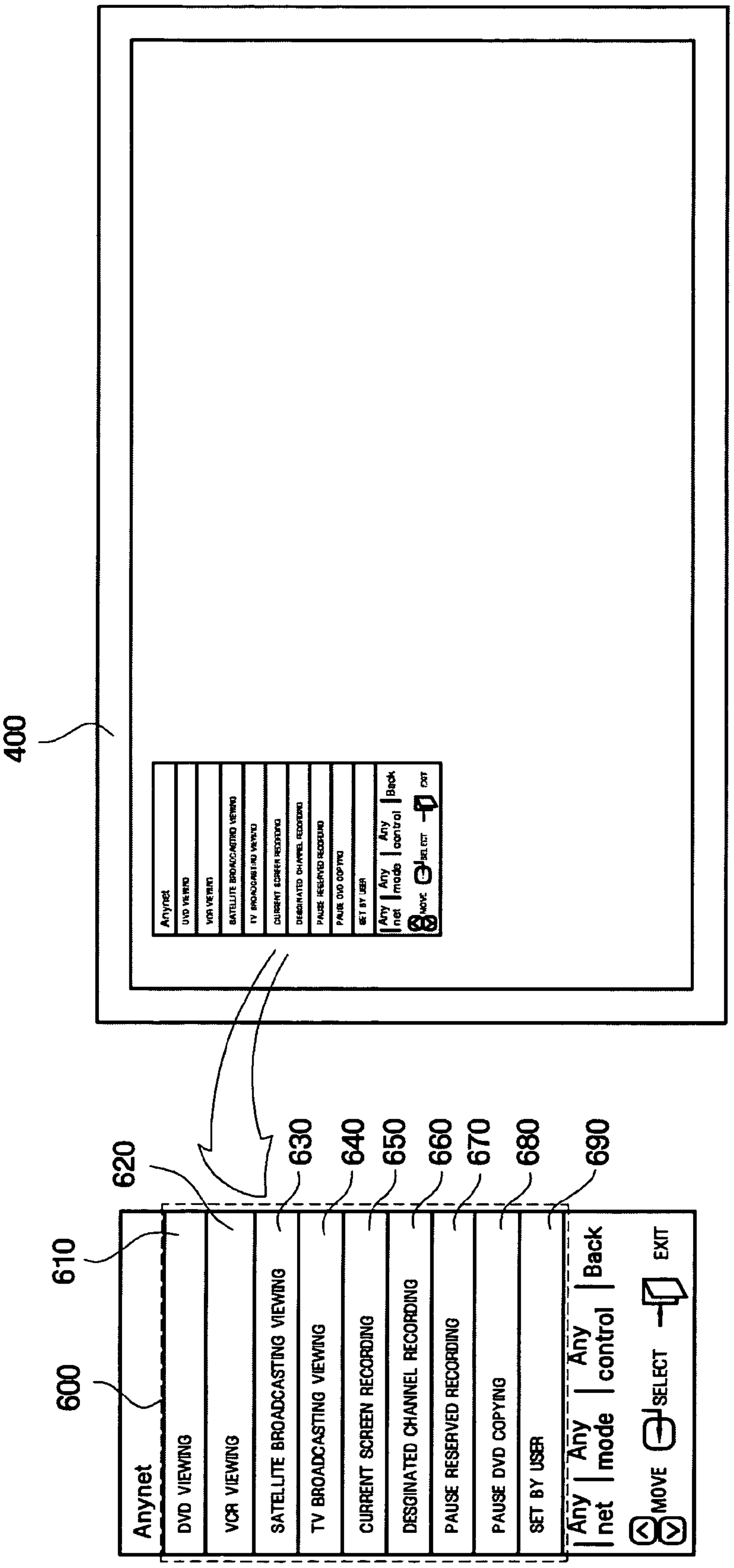
FIG. 5 is a view illustrating a menu providing unit according to an exemplary embodiment of the present invention.

For example, as shown in FIG. 5, when a user desires to control a predetermined slave device, the menu providing unit 600, which includes a plurality of execution icons corresponding to the operation control command set for controlling at least one slave device, is displayed through the icon providing unit 400.

When there exist sub-execution icons of the execution icon selected by the user, they are provided together.

When the user selects any one of DVD Viewing 610, VCR Viewing 620, Satellite Broadcasting Viewing 630, TV Viewing 640 and Current Screen Recording 650, the master device transmits operation control in command operation control command sets corresponding to the execution icon to the concerned slave device since there exists no sub-execution icons.

However, when the user selects any one of Designated Channel Recording 660, Reserved Recording 670, DVD Copying 660 and User's Setting 690, sub-execution icons are displayed so as to allow the user to select more detailed execution icons.

Figure 6:
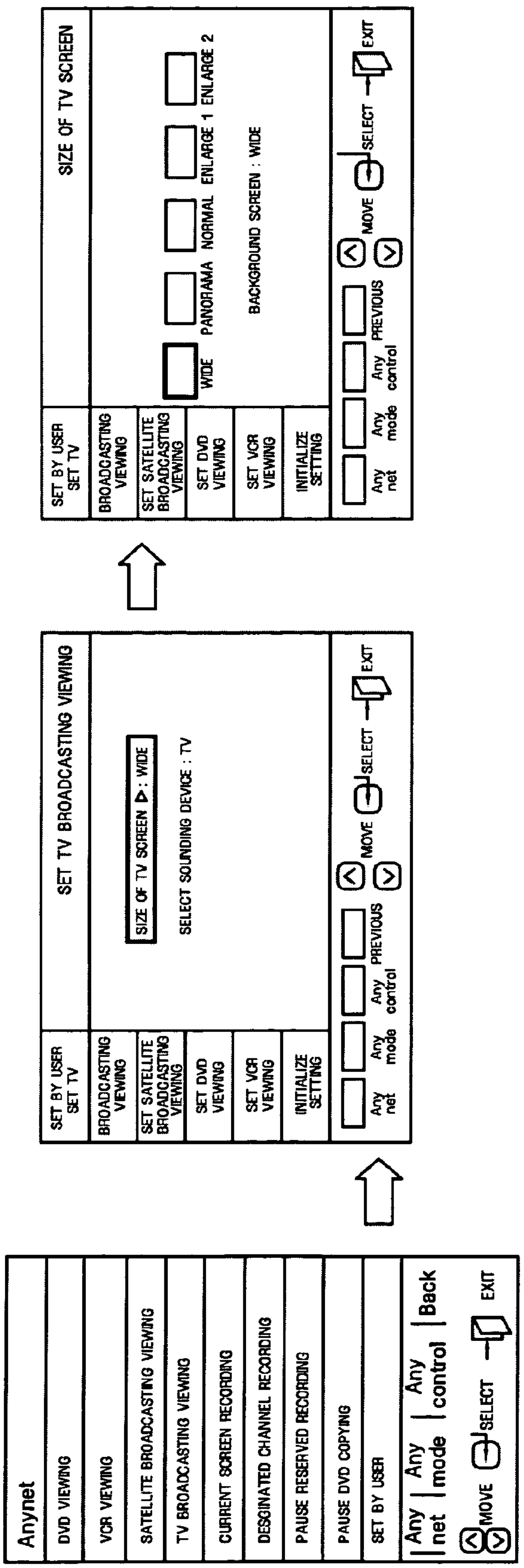
FIG. 6 is a view illustrating a sub-execution icon according to an exemplary embodiment of the present invention.

By way of example, FIG. 6 illustrates sub-execution icons displayed when the user selects User's Setting 690 in the menu providing unit 600.

As another exemplary embodiment of the present invention, the user may also change a screen mode which is currently viewed by him/her and a volume mode.

Figure 7:
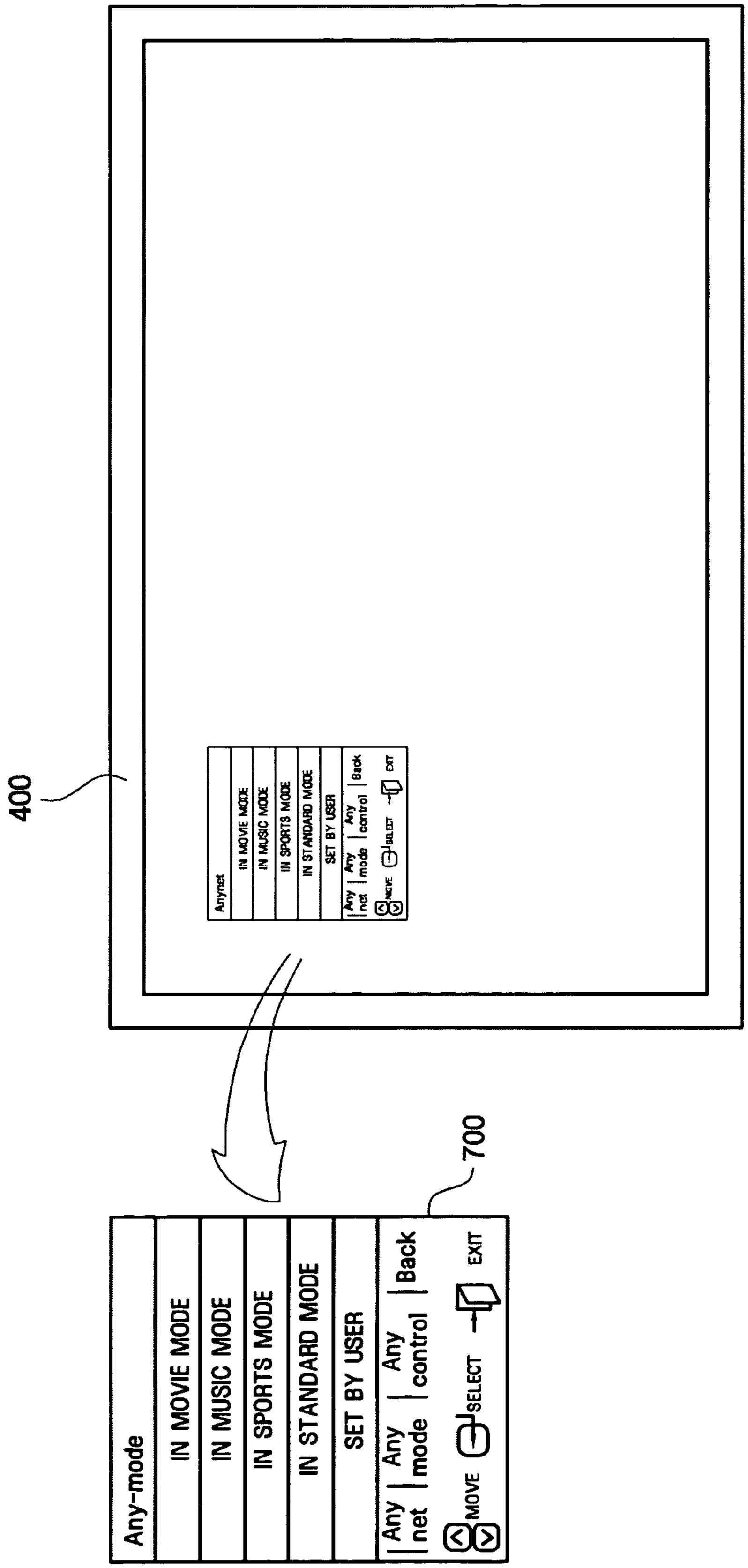
FIG. 7 is a view illustrating a mode execution icon according to an exemplary embodiment of the present invention.

If the mode item to change the screen mode and the volume mode is selected, in addition to the execution icon, a menu providing unit 700 may be displayed through the icon providing unit 400. The menu providing unit 700 includes a plurality of execution icons corresponding to mode operation control command sets to set up a screen mode or a volume mode of the concerned slave device, as illustrated in FIG. 7.

The execution icons which can be included in the menu providing unit 600 can be changed according to the kinds and characteristics of the master device and the slave devices and according to the user's taste.

When the user does not select a predetermined execution icon for a predetermined period of time, the plurality of execution icons displayed through the icon providing unit 400 disappear and are on standby until the user requests them (S104).

When the user selects an execution icon that he/she wishes to execute, a slave device corresponding to the selected execution icon is selected (S105).

In this exemplary embodiment of the present invention, it is assumed that there are (n) slave devices corresponding to the selected execution icon.

When a slave device corresponding to the selected execution icon is selected, the control unit 200 transmits an operation control command to a first slave device, which has been sequentially predetermined (S106).

For example, when the first slave device refers to a DVD player, the control command causes power supply to the DVD player to turn on or performs an operation to check insertion of a DVD into the DVD player.

A response signal to the transmitted operation control command is transmitted to the control unit 200 from the first slave device (S107).

The control unit 200 determines through the response signal whether the concerned first slave device operates normally (S108).

If it is determined that operation of the first slave device is normal, the number of slave devices whose determination is completed is ascertained (S109).

If it is ascertained that the number (i) of slave devices, whose determination is completed, is less than the number (a) of slave devices corresponding to the execution icons selected by the user, the control unit 200 increases the count of slave devices (i) and transmits a control command to a slave device that is next in the predetermined sequence (S110).

The control unit 200 transmits the command control command to the next slave device according to the increased count (S11).

Thereafter, the process of determining normal operation of the slave device through transmission of the control command and a response signal thereto by increasing the count by the number of slave devices corresponding to the execution icons selected by the user is repeated.

The control unit 200 transmits control commands to all of the slave devices corresponding to the execution icons selected by the user, and repeats the transmission until it receives response signals in response to these control commands. Through this process, the control unit 200 determines whether all the slave devices corresponding to the execution icon selected by the user operate normally.

At this time, if it is determined based on the response signals transmitted to the slave devices that all the slave devices operate normally, the slave devices corresponding to the execution icon selected by the user operate normally.

If there exists any slave device among the slave devices corresponding to the execution icon selected by the user that generates an error, the control unit 200 displays the content of the error and an alternative list of how to solve the error through the icon providing unit 400 (S112).

Figure 8:
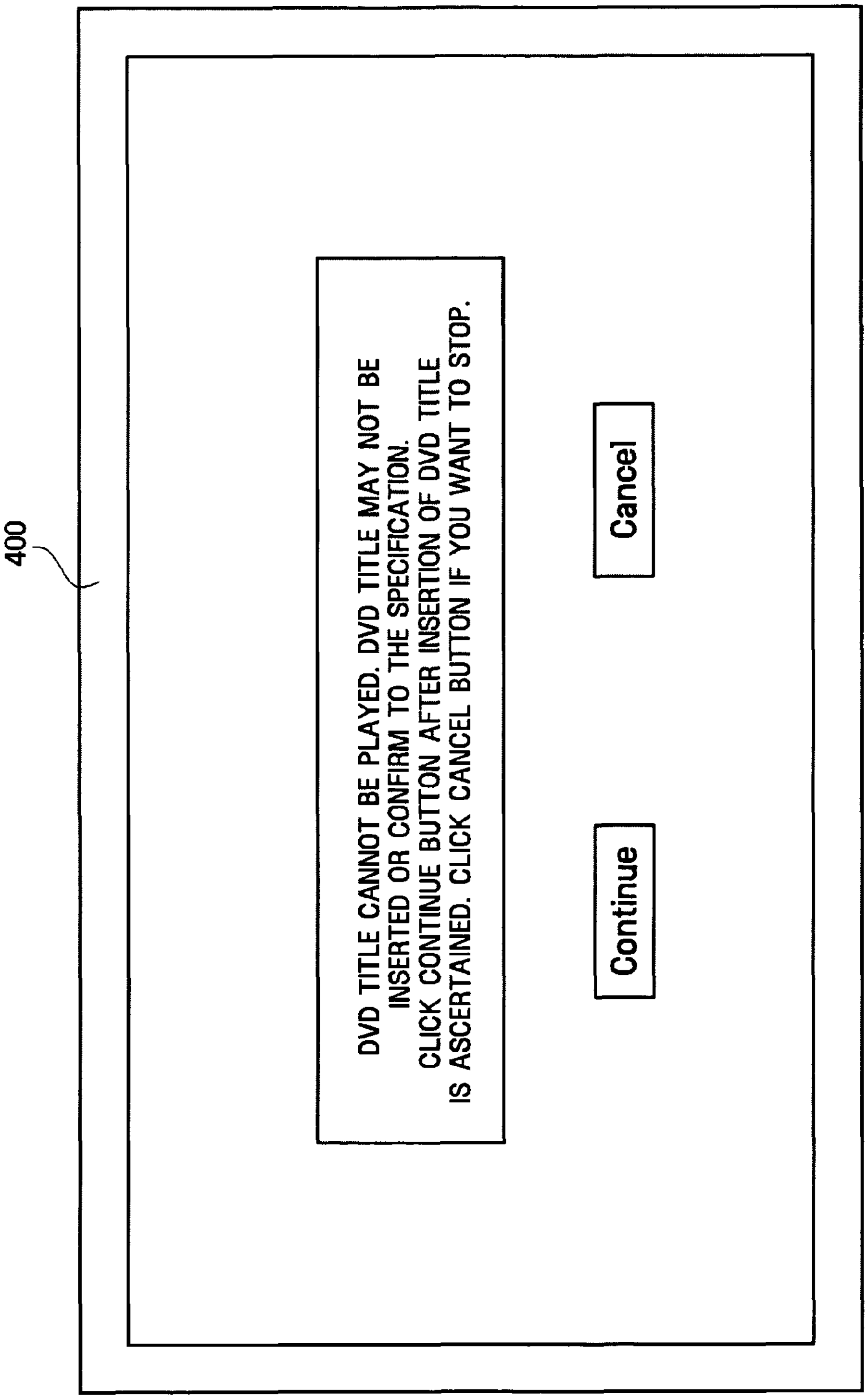
FIG. 8 is a view illustrating an alternative list corresponding to an error when the error is generated relative to a operation control command transmitted to a slave device according to an exemplary embodiment of the present invention.

As illustrated in FIG. 8, when no DVD is inserted into the DVD player, an error content is displayed and an alternative list of how to solve the error is provided to the user through the icon providing unit 400.

The alternative list is categorized according to operation control commands included in the operation control command sets and stored in the memory unit 100. The control unit 200 reads out the alternative list corresponding to the control command having generated an error from the memory unit and provides the alternative list to the user.

The control unit 200 determines whether to transmit a control command to a slave device that is next in the sequence through the error content and the alternative list (S113).

As described above, a universal remote control is used to allow a user to control a master device and plural slave devices connected to the master device, and operation control command sets including control commands to control at least one slave device are provided in the form of execution icons to allow the user to easily recognize them, and to control the concerned slave devices. This increases the user's convenience.

The present invention is also effective in that since execution icons provided to the user may be added or deleted depending upon if the addition or deletion of the slave devices connected to the master device is detected, the device control can more intelligently cope with the user's request.

Although the preferred embodiments and drawings of the present invention have been disclosed for illustrative purposes, those skilled in the art appreciate that various substitutions, modifications, changes and additions are possible, without departing from the scope and spirit of the invention as disclosed in the accompanying claims.

What is claimed is:

1. A method for performing specific functions to control operations of slave devices with a master device, comprising:

a first step of displaying execution icons, each of said execution icons displaying a command set that includes an operation control command for a series of operation controls of the master device or at least one of the slave devices;

a second step of receiving a selection of at least one of the execution icons; and a third step of controlling the series of operations corresponding to the selected at least one icon, wherein the first step includes providing sub-execution icons of each execution icon selected by the user, and wherein the third step includes:

transmitting the operation control command to a concerned slave device;

receiving a response signal to the operation control command from the concerned slave device;

determining whether the concerned device slave device operates normally based on the received response signal; and displaying contents of an error and an alternative list of how to solve the error if it is determined that the error has been generated.

2. A device for performing specific functions in a system to control operations of slave devices with a master device, comprising:

a user input receiving unit that receives an input from a user;

an icon providing unit that displays an icon displaying control commands for a series of operations stored in the memory, at the user's request;

a memory unit that stores command sets, each command set includes an operation control command for a series of operation controls of the master device or at least one of the slave devices; and a control unit that generates operation control signals of the master device or at least one of the slave devices when a operation control command set is selected, said generated operation control signals corresponding to the selected operation control command set, wherein the control unit transmits the operation control command to a concerned slave device, receives a response signal to the operation control command from the concerned slave device to determine whether the concerned slave device operates normally based on the received response signal, and displays contents of an error and an alternative list of how to solve the error if it is determined that the error has been generated.

3. The device as claimed in claim 2, wherein the alternative list is categorized according to each control command of the operation control command sets and stored in the memory unit.

4. A device for performing specific functions to control operations of slave devices with a master device, comprising:

a user input receiving unit that receives an input from a user;

a memory unit that stores command sets, each command set includes an operation control command for a series of operation controls of the master device or at least one of the slave devices;

a menu providing unit that displays an icon which displays each of the operation control command sets; and a control unit that controls an operation of the master device or at least one of the slave devices according to the operation control commands for the series of operations defined in a selected execution icon, wherein the control unit provides sub-execution icons corresponding to the execution icon selected by the user through the menu providing unit, wherein the control unit transmits the operation control command to a concerned slave device, receives a response signal to the operation control command from the concerned slave device to determine whether the concerned slave device operates normally based on the received response signal, and displays a content of an error and an alternative list of how to solve the error if it is determined that the error has been generated.

* * * * *